April 3, 1951 M. A. LALANDE 2,547,020

METHOD AND MEANS FOR THE TRANSMISSION OF LOW FREQUENCY CALLS IN TELECOMMUNICATION SYSTEMS BY INTERRUPTING THE CARRIER

Filed July 25, 1947 2 Sheets-Sheet 1

INVENTOR
MARC A. LALANDE

BY Robert Harding Jr.
ATTORNEY

April 3, 1951 M. A. LALANDE 2,547,020

METHOD AND MEANS FOR THE TRANSMISSION OF LOW FREQUENCY CALLS IN TELECOMMUNICATION SYSTEMS BY INTERRUPTING THE CARRIER

Filed July 25, 1947 2 Sheets-Sheet 2

INVENTOR
MARC A. LALANDE

BY Robert Harding Jr.

ATTORNEY

Patented Apr. 3, 1951

2,547,020

UNITED STATES PATENT OFFICE 2,547,020

METHOD AND MEANS FOR THE TRANSMISSION OF LOW-FREQUENCY CALLS IN TELECOMMUNICATION SYSTEMS BY INTERRUPTING THE CARRIER

Marc André Lalande, Paris, France, assignor to International Standard Electric Corporation, New York, N. Y., a corporation of Delaware Application July 25, 1947, Serial No. 763,618
In France December 26, 1944

Section 1, Public Law 690, August 8, 1946
Patent expires December 26, 1964

9 Claims. (Cl. 179—84)

The present invention relates to processes and means for the transmission of low frequency calls in telecommunication systems such as carrier current systems, radio links and/or voice frequency telephone systems.

According to some of its features, the invention provides a low frequency call transmission process in which, at the outgoing end, a modification of the carrier current is effected at a relatively low frequency by means that introduce important harmonics and insure a great depth of modulation, and at the receiving end there takes place a selection of one or more harmonics located in the portion of the range of voice frequencies in which the voice components still have only low or artificially reduced amplitudes.

The invention will be explained in detail in the following description, given with reference to the appended drawings, in which:

Figs. 1 and 3 respectively illustrate the transmitting and receiving portions of circuits of a radio system that employ features of the invention for the transmission and reception of call signals.

Figure 1:
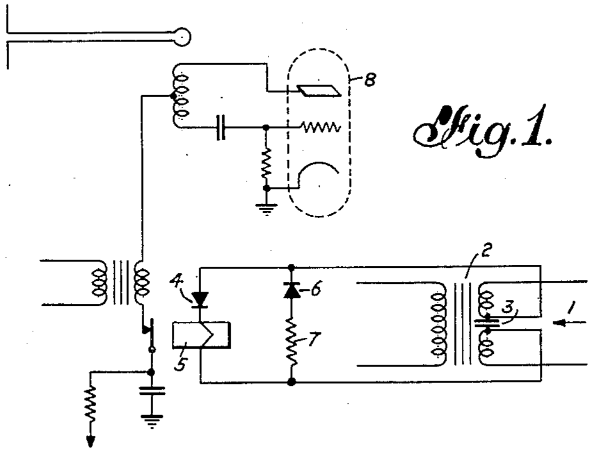

Referring to Fig. 1, the very low frequency call (e. g. at 20 C. P. S.) arrives over line 1, passes through the windings of transformer 2, and at the terminals of condenser 3 finds a path across rectifier 4 to relay 5 for the alternances of one direction, and across rectifier 6 and resistance 7 for those of the opposite direction.

Figure 2:
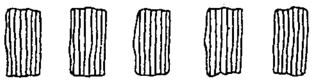
Fig. 2 illustrates the nature of a high frequency train of impulses employed for the transmission of calls.

At its rest contact, relay 5 closes the plate feed circuit of the oscillator tube 8. Under the action of the 20 C. P. S. call current, relay 5 opens the plate feed circuit 20 times a second, and this causes the sending of a high frequency train of impulses with substantially rectangular envelope, like that shown in Fig. 2.

If the device is to be used in a transmisssion system of the suppressed carrier current, it is necessary to add to this circuit a device that will cause emission of the carrier current during the duration of the call. Since such a device is well known in the art, it will not be described in detail.

Figure 3:
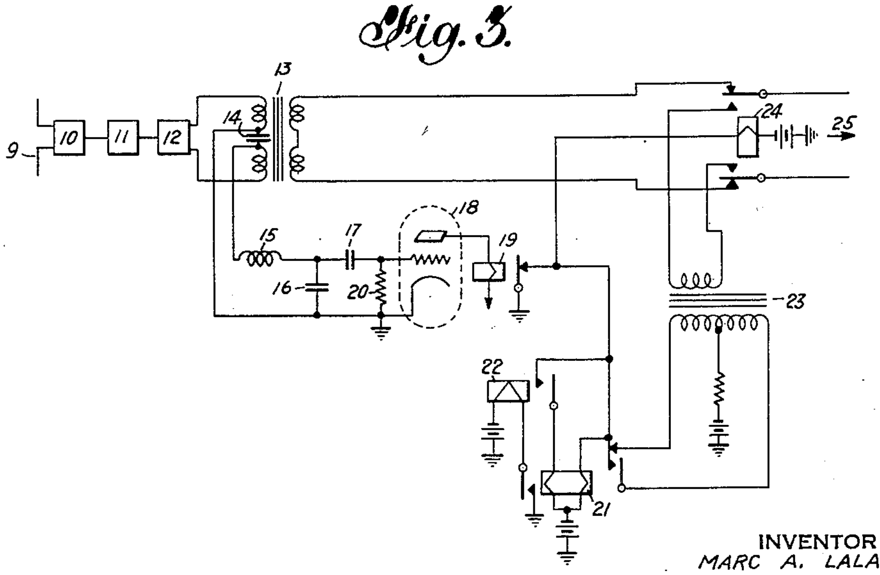

Fig. 3 illustrates the members affected by the transmission of calls at the receiving end. The high frequency signal received by the antenna 9 traverses a certain number of high frequency members 10 before terminating at the detector stage 11 which restores a low frequency signal. The subsequent members 12 are as a rule provided for the transmission of telephone frequencies and cannot permit passage of a frequency of the order of 20 C. P. S. However, the substantially rectangular envelope of the high frequency signal implies the existence of harmonics of 20 C. P. S. having amplitudes that are not negligible. The harmonics of the order of 120 C. P. S. can be transmitted by the telephone frequency circuits and reach the transformer 13.

The condenser 14 inserted in the primary winding of transformer 13 permits passage of the telephone frequencies which, by transformation, reach the line 25 across the rest contacts of the relay of line 24. Furthermore condenser 14, self-inductance 15 and condenser 16 form a circuit tuned to about 120 C. P. S.; a voltage of 120 C. P. S. develops at the condenser's terminals, while the other frequencies are substantially eliminated. Since the voice frequencies of the order of 120 C. P. S. are of very low amplitude with respect to that of the 20 C. P. S. call harmonics, the voltage developed by the voice at the terminals of condenser 16 will be negligible in practice.

The voltage developed by the call charges condenser 17, makes the grid of tube 18 strongly negative and causes release of relay 19 located in the tube's plate circuit. The resistance of grid 20 is provided with a high value in order to give a time constant of the order of 0.25 second to the condenser 17—resistance 20 circuit for the double purpose of keeping relay 19 on its rest contact during the duration of the train of impulses and of retarding its return into operation in order to prolong the duration of the call in case the same should be abnormally short, and thus give relays 21, 22 and 24 time to operate.

By means of its rest contact, relay 19 closes the circuit of relays 21 and 22 which control each other and are adjusted to beat at about 20 C. P. S. Furthermore, relay 21 periodically reverses the direction of the current in transformer 23, producing in the secondary an alternating current of 20 C. P. S. At the same time, relay 24 is set in operation by the rest contact of relay 19 and it sends into line 25 the call current proceeding from transformer 23.

It can be seen that there is thus created a call transmission system for radio links for carrier currents on cables that does not require having recourse to the conventitonal methods of frequency transposition.

Figure 4:
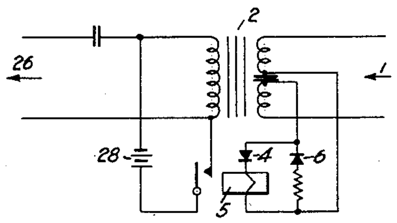
Figs. 4 and 5 illustrate two modifications of the circuits of Fig. 1 for the case in which the invention is applied to voice frequency telephone systems.
Figure 5:
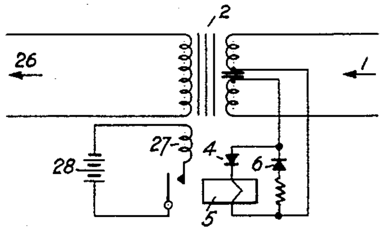

The call transmission process and means that have just been described can be advantageously applied to ordinary telephone systems, in which case the continuous current takes the part of the carrier current. It is then possible, for example, to periodically interrupt the plate feed circuit of an amplifier tube or, if there is none in the circuit, to use an arrangement like that shown in Fig. 4 or Fig. 5, in which the corresponding elements of Fig. 1 are indicated by the same reference numbers. The telephone line is in this case directly connected to the terminals of the secondary winding of transformer 2. The contact of relay 5 closes periodically, at the cadence of the call, the circuit of a battery on line 26 (Fig. 4) or on an additional winding 27 of transformer 2 (Fig. 5).

In this case of application, the receiving circuit is reduced to the elements 13 to 25 of Fig. 3.

In the case in which the described system is applied to bilateral connections over cable, the transformers 2 (Fig. 1) and 13 (Fig. 3) may be the ones existing in the 4-wire terminals connected by the long distance cable.

Figure 6:
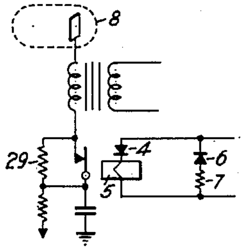
Figs. 6 and 7 illustrate variants of portions of the circuit of Fig. 1 for the transmission of calls.

Instead of completely cutting off the voltage of oscillator tube 8, it is possible to merely provide for its modification, e. g. as shown in the schematic diagram of Fig. 6, in which the contact of relay 5 short-circuits a resistance 29.

Figure 7:
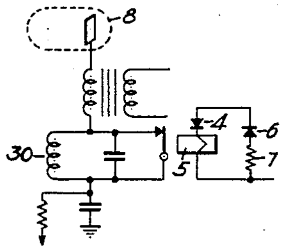

In order to favor the appearance in call signals of harmonics of the desired order, use may also be made of an arrangement like that shown in Fig. 7, in which a circuit 30, tuned to a frequency of between 100 and 150 C. P. S. for the case in question of a call at 20 C. P. S., is inserted in the plate circuit and is short-circuited by the contact of relay 5.

Figure 8:
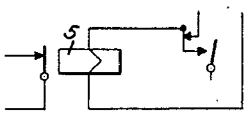
Fig. 8 illustrates the use of a ringing relay, but mounted according to a method that provides a slow cadence, as a variant of the devices of Figs. 1 and 4 to 7.

Rectifiers 4 and 6 shown in the various drawings may be eliminated by utilizing a relay 5 that is capable of following the positive and negative alternances of the call current; in particular, use may be made of a slow ringing relay like that shown in Fig. 8.

Any well known types of circuits for protection of the contacts or of shape correctors of the periodic currents may also be inserted in the circuits in question.

At the receiving end, the 20 C. P. S. current generating assembly formed by relays 21, 22 and transformer 23 may be eliminated if a source of current of suitable frequency is available at that place. Self-inductance 15 and condenser 16 of the harmonics selecting circuit may of course be reversed, since the 120 C. P. S. voltages at the terminals of the self-inductance and of the condenser are of the same order of magnitude.

Various further modifications and adaptations may be made in the described and illustrated arrangements without departing from the scope of the invention.

I claim:

1. In a signal communication system utilizing a carrier current for transmission, the method of transmitting and reproducing calls of a signal frequency low with respect to the frequencies in a predetermined signal range, comprising the steps of modulating said carrier current at the transmitter with a frequency corresponding to said low frequency call signals to produce one or more harmonics of said low frequency, receiving and selecting from said modulated carrier current certain of said harmonics located in portions of said predetermined signal range and reproducing the low frequency call from the energy of said selected harmonics.

2. The method as set forth in claim 1 wherein said carrier current is modulated to a relatively deep level whereby a signal containing harmonics of the call frequency contained within said predetermined signal range is produced and the reproducing step includes generating call signals in response to harmonic energy of call signal frequency independently of frequency conversion.

3. In a signal communication system having means for transmitting low frequency call signals on a carrier current, the combination comprising means for modulating said carrier current with a modulation call signal of a frequency below a predetermined signal range, means whereby said last named means is operative to produce a carrier wave including harmonics of said modulation signal within said predetermined signal range, means for receiving said last named carrier wave including means for selecting at least one harmonic of said modulation signal located in said predetermined signal range and means controlled by said selected harmonics for reproducing said low frequency call.

4. The signal communication system as set forth in claim 3 wherein said transmitting means includes means for generating a carrier current and means for controlling said generating means, and wherein said modulating means includes a relay device responsive to low frequency call signals connected to said control means, means whereby said relay device is operative to control the flow of carrier current and said receiving means includes, a relay device responsive to said selected harmonics within said predetermined signal range, a call frequency signal generator controlled by said relay device and means whereby said call frequency generator is operative to reproduce said call frequency independently of frequency conversion.

5. In a low frequency call transmitter the combination comprising means for generating and transmitting a carrier current of a predetermined frequency, means for modulating said carrier current with a first signal within a predetermined signal range, a relay, means for rendering said relay selectively responsive to call signals of a frequency below said signal range and means under control of said relay being operative to modulate said carrier current at a rate proportional to said call signal frequency to provide a modified carrier waveform having harmonics of said call frequency contained within said predetermined signal range.

6. A transmitter in accordance with claim 5 wherein said modulating means controlled by said relay includes a high frequency electronic oscillator, said relay being operatively connected to control the plate current of said oscillator.

7. A low frequency call transmitter in accordance with claim 5, including an electron discharge device controlling the carrier current and having a plate controlled circuit including a resistance and a shunting control therefor under control of said relay.

8. A low frequency call transmitter in accordance with claim 5, including an electron discharge device having a plate controlled circuit including a parallel resonant circuit approximately tuned to a desired harmonic and means for interrupting said plate control circuit under control of said relay.

9. A low frequency call receiving and reproducing system comprising a receiver operative to receive a carrier current modulated in accordance with a low frequency call signal, means at said receiver for generating signals at the call signal frequency and means solely responsive to harmonics of said call frequency signal as contained in said modulator carrier current for controlling said signal generator to reproduce said low frequency call signals.

MARC ANDRÉ LALANDE.

REFERENCES CITED

The following references are of record in the file of this patent:

UNITED STATES PATENTS

| Number | Name | Date |
|---|---|---|
| 1,624,506 | Pruden | Apr. 12, 1927 |
| 1,862,608 | Schemming | June 14, 1932 |
| 2,162,268 | Meszar | June 13, 1939 |
| 2,244,240 | Blumlein | June 3, 1941 |
| 2,284,085 | Collard | May 26, 1942 |
| 2,299,945 | Wendt | Oct. 27, 1042 |
| 2,306,687 | Cox | Dec. 29, 1942 |
| 2,319,306 | Dickeson | May 18, 1943 |
| 2,442,238 | Harings | May 25, 1948 |

OTHER REFERENCES

RCA Review, March 1948, vol. IX, No. 1, Television D. C. Component, by K. R. Wendt, pp. 85–111.